United States Patent
Lim et al.

(10) Patent No.: US 8,761,298 B2
(45) Date of Patent: Jun. 24, 2014

(54) APPARATUS AND METHOD FOR TRANSMITTING AND RECEIVING SIGNAL IN MULTIPLE INPUT MULTIPLE OUTPUT SYSTEM

(75) Inventors: Jong Bu Lim, Pohang-si (KR); Ui Kun Kwon, Pohang-si (KR); Chan Ho Choi, Pohang-si (KR); Gi Hong Im, Pohang-si (KR)

(73) Assignees: Samsung Electronics Co., Ltd., Suwon-si (KR); Postech Academy-Industry Foundation, Pohang-si (KR)

( * ) Notice: Subject to any disclaimer, the term of this patent is extended or adjusted under 35 U.S.C. 154(b) by 547 days.

(21) Appl. No.: 12/565,894

(22) Filed: Sep. 24, 2009

(65) Prior Publication Data

US 2010/0074362 A1 Mar. 25, 2010

(30) Foreign Application Priority Data

Sep. 25, 2008 (KR) .................. 10-2008-0094291

(51) Int. Cl.
 *H04L 27/00* (2006.01)
 *H03C 1/52* (2006.01)
(52) U.S. Cl.
 USPC ........................ 375/295; 375/299; 375/301
(58) Field of Classification Search
 USPC ............. 375/219, 220, 222, 240.26–240.29, 375/276, 271, 278, 285, 284, 295, 315, 316, 375/340, 240.26–240.27, 299, 347, 346, 375/349; 370/310, 344, 341
 See application file for complete search history.

(56) References Cited

U.S. PATENT DOCUMENTS

| | | | |
|---|---|---|---|
| 2002/0118771 A1* | 8/2002 | Larsson | 375/267 |
| 2005/0254592 A1 | 11/2005 | Naguib et al. | |
| 2007/0041457 A1 | 2/2007 | Kadous et al. | |
| 2007/0183533 A1 | 8/2007 | Schmidl et al. | |
| 2008/0181191 A1* | 7/2008 | Hillery et al. | 370/339 |
| 2010/0029222 A1* | 2/2010 | Doubchak et al. | 455/101 |
| 2010/0074357 A1* | 3/2010 | Ko | 375/267 |
| 2010/0248634 A1* | 9/2010 | Noh et al. | 455/63.1 |
| 2012/0216092 A1* | 8/2012 | Lee et al. | 714/748 |

FOREIGN PATENT DOCUMENTS

| | | | |
|---|---|---|---|
| KR | 1020070045893 A | | 5/2007 |
| KR | 1020080004650 A | | 1/2008 |
| KR | 1020080013666 A | | 2/2008 |
| WO | WO 2008007897 A2 * | | 1/2008 |

* cited by examiner

*Primary Examiner* — Sam K Ahn
*Assistant Examiner* — Linda Wong
(74) *Attorney, Agent, or Firm* — NSIP Law (57) ABSTRACT

A method and apparatus for transmitting and/or receiving a signal in a multiple input multiple output (MIMO) system are provided. An apparatus for transmitting a signal in a multiple input multiple output (MIMO) system includes an input unit to receive $N_T$ symbol streams in parallel, where $N_T$ is an integer greater than or equal to 2, a multiple signal generating unit to generate $N_T$ multiple signals having a transmit diversity gain by applying a cyclic delay of a different pattern to each of the $N_T$ symbol streams, and a multiple signal providing unit to provide the generated $N_T$ multiple signals to $N_T$ transmit antennas, respectively, based on a predetermined transmit antenna index of each of the $N_T$ transmit antennas.

17 Claims, 7 Drawing Sheets

APPARATUS AND METHOD FOR TRANSMITTING AND RECEIVING SIGNAL IN MULTIPLE INPUT MULTIPLE OUTPUT SYSTEM

CROSS-REFERENCE TO RELATED APPLICATION(S)

This application claims the benefit under 35 U.S.C. §119 (a) of a Korean Patent Application No. 10-2008-0094291, filed on Sep. 25, 2008, in the Korean Intellectual Property Office, the disclosure of which is incorporated herein by reference in its entirety for all purposes.

BACKGROUND

1. Field

The following description relates to a method and apparatus for transmitting and/or receiving a signal in a multiple input multiple output (MEMO) system.

2. Description of the Related Art

Multiple antennas may be a key for a next generation mobile communication system to improve the throughput without increasing frequency resources. A gain using the multiple antennas may be classified into a diversity gain and a multiplexing gain.

The diversity gain may improve the reliability of a transmission signal and the error performance of a communication system. The multiplexing gain may increase the data transmission rate.

Generally, conventional technologies associated with the multiple antennas may have either the diversity gain or the multiplexing gain. For a space-time block coding (STBC) technology using the multiple antennas, at least two transmit antennas may be needed to reduce the data transmission rate.

SUMMARY

In one general aspect, there is provided a method and system for transmitting and receiving a signal that have both a diversity gain and a multiplexing gain regardless of a number of transmit antennas.

In another general aspect, there is provided a multiple antenna multiplexing technology having a transmit diversity gain that is applicable to a multiple antenna technology of a multi-node collaborating technology where network constituent elements collaborate with each other.

In still another general aspect, there is provided a signal transmission apparatus including an input unit to receive $N_T$ symbol streams in parallel, where $N_T$ is an integer greater than or equal to 2, a multiple signal generating unit to generate $N_T$ multiple signals having a transmit diversity gain by applying a cyclic delay of a different pattern to each of the $N_T$ symbol streams, and a multiple signal providing unit to provide the generated $N_T$ multiple signals to $N_T$ transmit antennas, respectively, based on a transmit antenna index of each of the $N_T$ transmit antennas.

The input unit may convert a phase of each of the $N_T$ symbol streams to provide the $N_T$ symbol streams with the converted phase to the multiple signal generating unit.

The input unit may convert a phase of each of the $N_T$ symbol streams to satisfy a condition that $\Delta_{p,i}-\Delta_{p-1,i}>L$ and a condition that $|det(D(k))|$ has a value of '1'. The multiple signal generating unit may apply the cyclic delay of the different pattern to each of the $N_T$ symbol streams, provided from the input unit, to satisfy the condition of $\Delta_{p,i}-\Delta_{p-1,i}>L$ and the condition that $|det(D(k))|$ has the value of '1'. Here, $\Delta_{p,i}$ denotes a cyclic delay value to be applied to an $i^{th}$ symbol stream that is transmitted via a $p^{th}$ transmit antenna, L denotes a length of a channel response, $|det(D(k))|$ denotes an absolute value of a D(k) matrix determinant corresponding to a phase rotation and the cyclic delay.

The multiple signal generating unit may include a cyclic delay pattern application unit to apply the cyclic delay of the different pattern to each of the $N_T$ symbol streams, an adder to add up $N_T$ outputs of the cyclic delay pattern application unit, and a power level adjustment unit to adjust a power level of a signal that is output from the adder.

The cyclic delay of the different pattern may be expressed by $\Delta_i(p-N_T)_{N_T}$. Here, $\Delta_i$ denotes a cyclic delay value, i denotes a symbol stream index, and p denotes a transmit antenna index where p=1, 2, ..., $N_T$.

The power level adjustment unit may adjust the power level of the signal to be $1/\sqrt{N_T}$.

The cyclic delay of the different pattern may be expressed by $\Delta_i(p-N_T)_{N_T}$, where $\Delta_i$ denotes a cyclic delay value, i denotes a symbol stream index, and p denotes a transmit antenna index where p=1, 2, ..., $N_T$.

The cyclic delay value $\Delta_i$ may be set to be greater than a length of a channel response.

In yet another general aspect, there is provided a signal reception apparatus including $N_R$ receive antennas, each to receive a multiple signal having a transmit diversity gain, where $N_R$ is an integer greater than or equal to 2, and a cyclic prefix (CP) removal unit to remove a CP in the multiple signals having the transmit diversity gain. The multiple signals having the transmit diversity gain may be generated by applying, by a transmission device, a cyclic delay of a different pattern to each of $N_T$ symbol streams, and the generated $N_T$ multiple signals may be transmitted via $N_T$ transmit antennas, respectively, where $N_T$ is an integer greater than or equal to 2.

The channel impulse response between the $N_T$ transmit antennas and the $N_R$ receive antennas may be defined by the following equation:

$$h_{q,i}^{eq}(k) = \frac{1}{\sqrt{N_T}} \sum_{p=1}^{N_T} \tilde{h}_{q,p}^i(k - \Delta_i(p-i)_{N_T})_N$$

$$\tilde{h}_{q,p}^i = \exp\left(j2\pi \frac{i(p-i)_{N_T}}{N_T}\right) h_{q,p},$$

where i denotes a symbol stream index, q denotes a receive antenna index, p denotes a transmit antenna index, $\Delta_i$ denotes a cyclic delay value, k denotes a sample index of a symbol stream, and N denotes a block size of the symbol stream.

The cyclic delay of the different pattern may be expressed by $\Delta_i(p-N_T)_{N_T}$, where $\Delta_i$ denotes a cyclic delay value, i denotes a symbol stream index, and p denotes a transmit antenna index where p=1, 2, ..., $N_T$.

The $N_T$ symbol streams with a converted phase may be defined by the following equation:

$$\tilde{s}_{i,p} = \exp\left(j2\pi \frac{i(p-i)_{N_T}}{N_T}\right) s_i,$$

where $\tilde{s}_{i,p}$ denotes the $N_T$ symbol streams with the converted phase, $s_i$ denotes the $N_T$ symbol streams, and i denotes a symbol stream index, and p denotes a transmit antenna index where p=1, 2, ..., $N_T$.

In a further general aspect, there is provided a signal transmission method including receiving $N_T$ symbol streams in parallel, where $N_T$ is an integer, greater than or equal to 2, generating $N_T$ cyclic delay signals by applying a cyclic delay of a different pattern to each of the $N_T$ symbol streams, generating $N_T$ multiple signals having a transmit diversity gain by coupling the $N_T$ cyclic delay signals, and providing the generated $N_T$ multiple signals to $N_T$ transmit antennas, respectively, based on a transmit antenna index of each of the $N_T$ transmit antennas.

The generating of the $N_T$ cyclic delay signals may comprise converting a phase of each of the $N_T$ symbol streams and applying the cyclic delay of the different pattern to each of the $N_T$ symbol streams with the converted phase.

The generating of the $N_T$ cyclic delay signals may comprise converting a phase of each of the $N_T$ symbol streams and applying the cyclic delay of the different pattern to each of the phase-converted $N_T$ symbol streams to be a condition that $\Delta_{p,i} - \Delta_{p-1,i} > L$ and a condition that $|\det(D(k))|$ has a value of '1', where $\Delta_{p,i}$ denotes a cyclic delay value to be applied to an $i^{th}$ symbol stream that is transmitted via a $p^{th}$ transmit antenna, L denotes a length of a channel response, and $|\det(D(k))|$ denotes an absolute value of a D(k) matrix determinant corresponding to a phase rotation and the cyclic delay.

The generating of the $N_T$ multiple signals may comprise adding up the $N_T$ cyclic delay signals to output an addition signal, and adjusting a power level of the addition signal.

The cyclic delay of the different pattern may be expressed by $\Delta_i(p-N_T)_{N_T}$, where $\Delta_i$ denotes a cyclic delay value, i denotes a symbol stream index, and p denotes a transmit antenna index where $p=1, 2, \ldots, N_T$.

The power level of the addition signal may be adjusted to be $1/\sqrt{N_T}$.

The cyclic delay value $\Delta_i$ may be set to be greater than a length of a channel response.

Other features will become apparent to those skilled in the art from the following detailed description, which, taken in conjunction with the attached drawings, discloses exemplary embodiments.

BRIEF DESCRIPTION OF THE DRAWINGS

Throughout the drawings and the detailed description, unless otherwise described, the same drawing reference numerals will be understood to refer to the same elements, features, and structures. The elements may be exaggerated for clarity and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

A method and apparatus for transmitting and/or receiving a signal according to example(s) disclosed herein may combine a multi-carrier scheme and a single-carrier scheme that may be used as a mobile communication radio access technology, so as to simultaneously improve an error correction performance and a data transmission rate. The method and apparatus may be used as a key multiple antenna technology for a multi-node collaborating communication. The method and apparatus may be applicable to a multiple input multiple output (MIMO) system having $N_T$ transmit antennas and $N_R$ receive antennas. Here, $N_T$ and $N_R$ are integers greater than or equal to 2.

Figure 1:
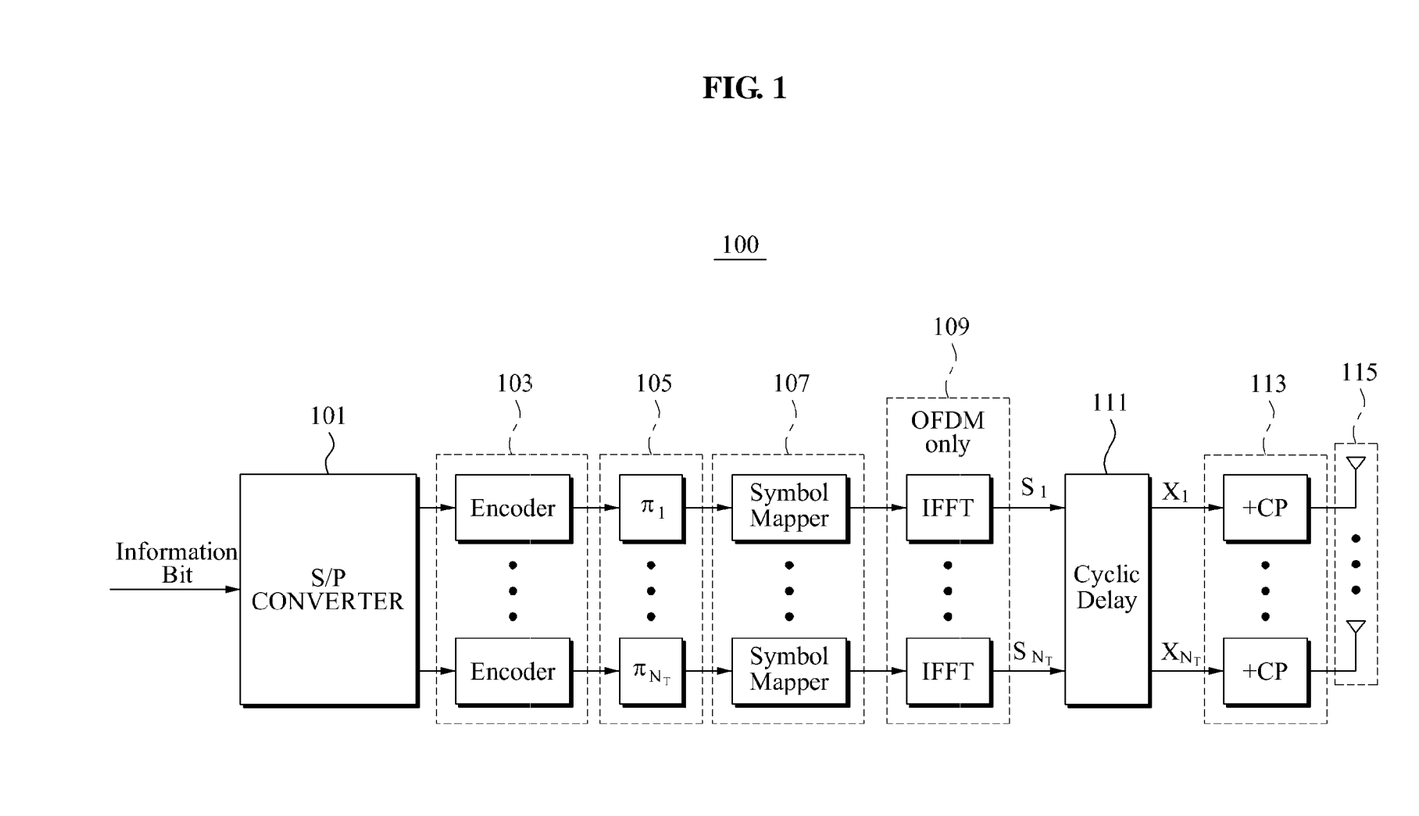
FIG. 1 is a block diagram illustrating a configuration of a transmission end of an exemplary multiple input multiple output (MIMO) apparatus.

FIG. 1 illustrates an example of a transmission end 100 of an exemplary MIMO apparatus.

As illustrated in FIG. 1, the transmission end 100 includes a serial/parallel (S/P) converter 101, an encoding unit 103, an interleaving unit 105, a symbol mapping unit 107, a cyclic delay 111, a cyclic prefix (CP) insertion unit 113, and an antenna unit 115.

In the case of a MIMO system using an orthogonal frequency division multiplexing (OFDM) technology, the transmission end 100 may further include an inverse fast Fourier transforming (IFFT) unit 109.

The S/P converter 101 may convert a serial-input information bit to $N_T$ parallel streams.

The encoding unit 103 may include $N_T$ encoders to encode the $N_T$ parallel streams, respectively. The interleaving unit 105 may include $N_T$ interleavers to interleave the encoded $N_T$ parallel streams, respectively.

The symbol mapping unit 107 may include $N_T$ symbol mappers to perform symbol mapping for output signals of the interleaving unit 105, respectively, according to a modulation scheme.

Hereinafter, an output signal $\{s_i(n)\}_{n=0}^{N-1}$ of the symbol mapping unit 107 or the IFFT unit 109 may be referred to as a symbol stream.

A single symbol stream may be expressed by $N_T$ layers.

The cyclic delay 111 may apply a cyclic delay of a different pattern to each of $N_T$ symbol streams to generate $N_T$ multiple signals $X_P$ having a transmit diversity gain. The generated $N_T$ multiple signals $X_P$ may be provided to transmit antennas included in the antenna unit 115 via $N_T$ CP inserters of the CP insertion unit 113, respectively, based on a transmit antenna index p. Here, $p=1, 2, \ldots, N_T$.

The CP insertion unit 113 may insert a CP into each of the $N_T$ multiple signals $X_P$ to provide the $N_T$ multiple signals $X_P$ with the inserted CP to the antenna unit 115.

Figure 2:
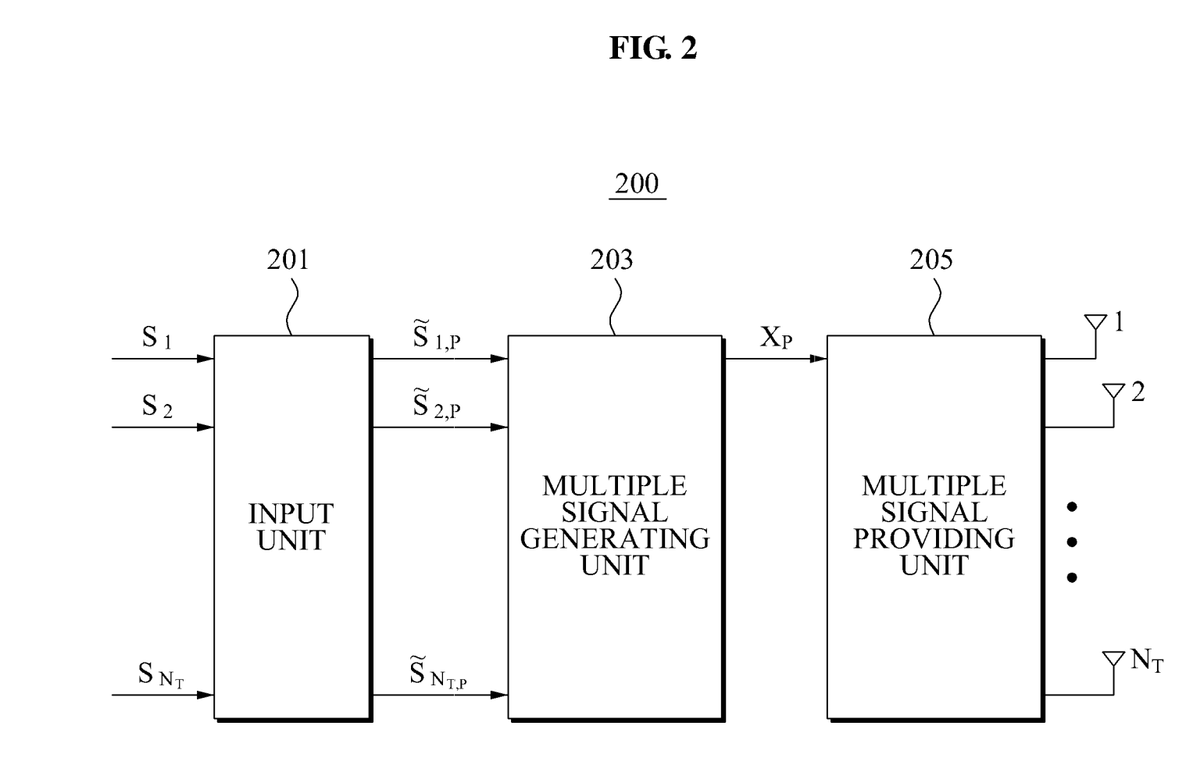
FIG. 2 is a block diagram illustrating a configuration of an exemplary signal transmission apparatus.

FIG. 2 illustrates an exemplary signal transmission apparatus 200.

The signal transmission apparatus 200 may be applicable to the cyclic delay 111 of FIG. 1.

As illustrated in FIG. 2, the signal transmission apparatus 200 includes an input unit 201, a multiple signal generating unit 203, and a multiple signal providing unit 205.

The input unit 201 may receive $N_T$ symbol streams in parallel. Here, $N_T$ is an integer greater than or equal to 2.

The multiple signal generating unit 203 may apply a cyclic delay of a different pattern to each of the $N_T$ symbol streams that are provided from the input unit 201 to generate $N_T$ multiple signals $X_P$ having a transmit diversity gain.

The multiple signal providing unit 205 may provide the $N_T$ multiple signals $X_p$ to $N_T$ transmit antennas, respectively, based on a transmit antenna index p. Here, p=1, 2, ..., $N_T$.

For example, the multiple signal providing unit 205 may provide a $p^{th}$ multiple signal to a $p^{th}$ transmit antenna. The $p^{th}$ multiple signal may be inserted with a $p^{th}$ CP and then be provided to the $p^{th}$ transmit antenna.

The cyclic delay of the different pattern may be expressed by $\Delta_i(p-N_T)_{N_T}$. Here, $\Delta_i$ denotes a cyclic delay value and i denotes a symbol stream index.

The cyclic delay value $\Delta_i$ may be set to be greater than a length L of a channel response.

Accordingly, the multiplex signal $x_p=[x_p(0), x_p(1), \ldots, x_p(N-1)]$ may be obtained from the symbol stream $\{s_i(n)\}_{n=0}^{N-1}$. Here, p and I=1, ..., $N_T$. In the case of the multiple signal $X_p$, a symbol stream corresponding to each layer may have a transmit diversity gain and may also be decoupled from a reception end, which may be expressed by the following Equation 1:

$$x_p(k) = \frac{1}{\sqrt{N_T}} \sum_{i=1}^{N_T} s_i(k - \Delta_i(p - i)_{N_T})_N, \quad (1)$$

where i denotes the symbol stream index, p denotes the transmit antenna index, $\Delta_i$ denotes the cyclic delay value, k denotes a time domain sample index of the symbol stream, and N denotes a block size of the symbol stream.

The input unit 201 may convert a phase of each of the $N_T$ symbol streams $s_i$ to provide the $N_T$ symbol streams $\tilde{s}_{i,p}$ with the converted phase to the multiple signal generating unit 203. The $N_T$ symbol streams $\tilde{s}_{i,p}$ with the converted phase may be expressed by the following Equation 2:

$$\tilde{s}_{i,p} = \exp\left(j2\pi \frac{(i(p-i))_{N_T}}{N_T}\right) s_i. \quad (2)$$

When using the symbol streams $\tilde{s}_{i,p}$ with the converted phase, a singularity of an equivalent MIMO channel may be avoided.

The multiple signal Xp with the inserted CP may be transmitted via a radio channel that is modeled via an $L_{th}$ order finite impulse response (FIR) filter. In this case, a time domain channel impulse response (CIR) between a $p^{th}$ transmit antenna and a $q^{th}$ receive antenna may be expressed by the following Equation 3:

$$h_{q,p} = [h_{q,p}(0), h_{q,p}(1), \ldots, h_{q,p}(L), 0, \ldots, 0]^T \quad (3).$$

A frequency domain CIR may be obtained by performing a fast Fourier transform (FFT) for the time domain CIR, and may be expressed by the following Equation 4:

$$\lambda_{q,p} = [\lambda_{q,p}(0), \lambda_{q,p}(1), \ldots, \lambda_{q,p}(N-1)]^T \quad (4).$$

A virtual channel response between an $i^{th}$ transmit layer and the $q^{th}$ receive antenna may be expressed by the following Equation 5:

$$h_{q,i}^{eq} = [h_{q,i}^{eq}(0), h_{q,i}^{eq}(1), \ldots, h_{q,i}^{eq}(N-1)]^T \quad (5)$$

$$h_{q,i}^{eq}(k) = \frac{1}{\sqrt{N_T}} \sum_{p=1}^{N_T} h_{q,p}(k - \Delta_i(p-i)_{N_T})_N.$$

Referring to the above Equation 3 through Equation 5, through a transmission signal mapping using the cyclic delay of the different pattern, it may be understood that the symbol stream $\{s_i(n)\}_{n=0}^{N-1}$ corresponding to each layer has passed through a virtual MIMO channel $h_{q,i}^{eq}$.

Where the cyclic delay value $\Delta_i$ is greater than the length L of the channel response, each equivalent channel tap $h_{q,i}^{eq}(k)$ may not include a sum of time domain channel taps. Accordingly, a frequency selectivity of each equivalent channel may increase whereby a maximum transmit diversity gain may be obtained.

Zero$^{th}$ subchannels of all the $i^{th}$ layers where i=1, ..., $N_T$ may have the same frequency domain channel response, as given by the following Equation 6:

$$\lambda_{q,i}^{eq}(0) = \frac{1}{\sqrt{N_T}} \sum_{p=1}^{N_T} \sum_{l=0}^{L} h_{q,p}(l). \quad (6)$$

Accordingly, a MIMO channel corresponding to the Zero$^{th}$ subchannel may be a singular matrix and the reception end may not detect a signal of each layer. The above singularity problem of the equivalent MEMO channel may be solved by changing a phase of a symbol stream corresponding to each layer, as described above.

The multiplex signal $X_p$ obtained from the phase-converted symbol stream may be expressed by the following Equation 7:

$$x_p(k) = \frac{1}{\sqrt{N_T}} \sum_{i=1}^{N_T} \tilde{s}_{i,p}(k - \Delta_i(p - i)_{N_T})_N \quad (7)$$

$$\tilde{s}_{i,p} = \exp\left(j2\pi \frac{(i(p-i))_{N_T}}{N_T}\right) s_i.$$

The virtual channel response between the $i^{th}$ transmit layer and the $q^{th}$ receive antenna may be expressed by the following Equation 8:

$$h_{q,i}^{eq}(k) = \frac{1}{\sqrt{N_T}} \sum_{p=1}^{N_T} \tilde{h}_{q,p}^i(k - \Delta_i(p-i)_{N_T})_N \quad (8)$$

$$\tilde{h}_{q,p}^i = \exp\left(j2\pi \frac{(i(p-i))_{N_T}}{N_T}\right) h_{q,p}.$$

Figure 3:
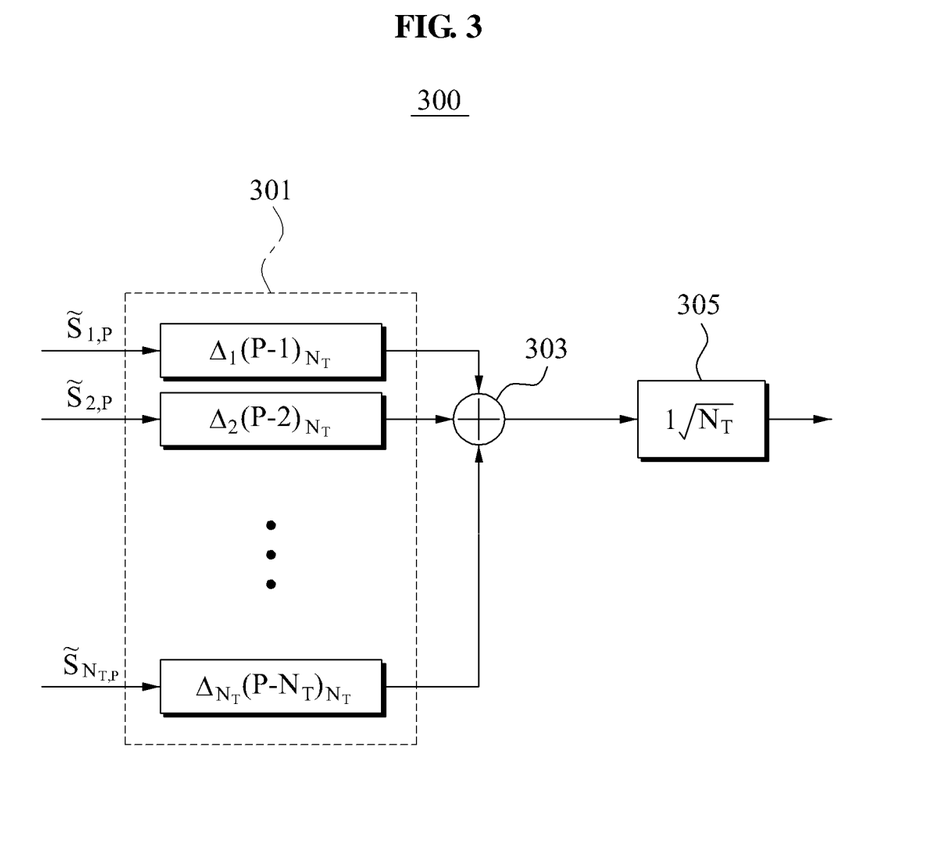
FIG. 3 is a block diagram illustrating a configuration of an exemplary multiple signal generating unit.

FIG. 3 illustrates an exemplary multiple signal generating unit 300.

The multiple signal generating unit 300 may be applicable to the multiple signal generating unit 203 of FIG. 2.

As illustrated in FIG. 3, the multiple signal generating unit 300 includes a cyclic delay pattern application unit 301, an adder 303, and a power level adjustment unit 305.

The cyclic delay pattern application unit 301 may apply a cyclic delay $\Delta_i(p-N_T)_{N_T}$ of a different pattern to each of $N_T$ symbol streams.

The adder 303 may add up $N_T$ outputs of the cyclic delay pattern application unit 301. The power level adjustment unit 305 may adjust a power level of a signal, output from the adder 303, to be $1/\sqrt{N_T}$.

Accordingly, the final signal that is output by the multiple signal generating unit 300 may be expressed by the above Equation 7.

Here, the cyclic delay value $\Delta_i$ may be variable and may also be set to be greater than the length L of the channel response.

Figure 4:
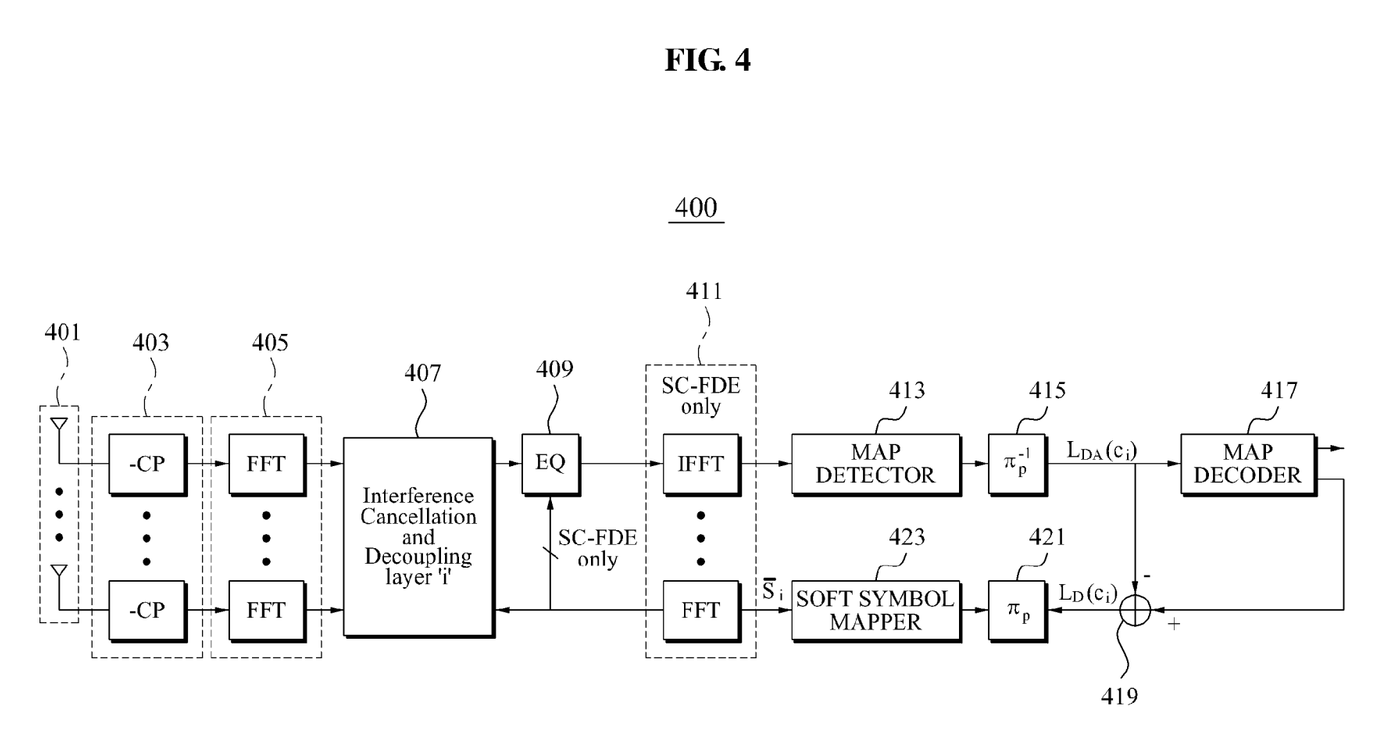
FIG. 4 is a block diagram illustrating a configuration of a reception end of an exemplary MIMO apparatus.

FIG. 4 illustrates an example of a reception end 400 of an exemplary MIMO apparatus.

As illustrated in FIG. 4, the reception end 400 includes a receive antenna unit 401, a CP removal unit 403, a FFT unit 405, an interference cancellation and decoupling layer 'i' 407, an equalizer 409, a maximum a posteriori (MAP) detector 413, a de-interleaver $\pi_p^{-1}$ 415, a MAP decoder 417, an adder 419, an interleaver $\pi_p$ 421, and a soft symbol mapper 423.

In the case of a MIMO system using a single carrier with frequency domain equalization (SC-FDE), the reception end 400 may further include an IFFT unit 411.

Referring to FIG. 4, in the MIMO system, a signal reception apparatus may include the receive antenna unit 401 having $N_R$ receive antennas, and the CP removal unit 403 that removes a CP from a multiple signal having a transmit diversity gain. Here, $N_R$ is an integer greater than or equal to 2.

The multiple signal having the transmit diversity gain may be generated by applying a cyclic delay $\Delta_i(p-N_T)_{N_T}$ of a different pattern to each of $N_T$ symbol streams in a transmission apparatus. The $N_T$ multiple signals may be transmitted via $N_T$ transmit antennas, respectively.

The FFT unit 405 may convert a time domain signal to a frequency domain signal.

The interference cancellation and decoupling layer 'i' 407 may cancel multiple signal interference in the frequency domain signal and decouple a received signal in which the multiple signal interference is cancelled, for each layer.

The equalizer 409 may perform a channel equalization. The MAP detector 413 may perform a MAP detection using the channel equalization result.

The de-interleaver 415 may be a configuration corresponding to an interleaver of a transmission end and thus may perform de-interleaving.

The MAP decoder 417 may decode an output of the de-interleaver 415. The adder 419 may add up an output of the MAP decoder 417 and the output of the de-interleaver 415 to provide an output of the adder 419 to the interleaver 421.

The interleaver 421 may interleave an input signal to provide the interleaved input signal to the soft symbol mapper 423. The soft symbol mapper 423 may provide a mapped signal to the interference cancellation and decoupling layer 'i' 407 so that an iterative detection may be performed.

In some implementations, the above method and apparatus for transmitting and/or receiving a signal may have a compatibility to be applicable to a general MIMO signal detection technology.

<MIMO Equalization and Detection>

In a reception end, a received signal r in which a CP is cancelled may be expressed by the following Equation 9:

$$r = H^{eq}s + w \quad (9).$$

Here, $H^{eq}$ may be expressed by the following Equation 10:

$$H^{eq} = \begin{bmatrix} H^{eq}_{1,1} & H^{eq}_{1,2} & \cdots & H^{eq}_{1,N_T} \\ H^{eq}_{2,1} & H^{eq}_{2,2} & \cdots & H^{eq}_{2,N_T} \\ \vdots & \vdots & \ddots & \vdots \\ H^{eq}_{N_R,1} & H^{eq}_{N_R,2} & \cdots & H^{eq}_{N_R,N_T} \end{bmatrix}. \quad (10)$$

$H_{q,i}^{eq} \triangleq \text{Circ}_N[h_{q,i}^{eq}(0), h_{q,i}^{eq}(1), \ldots, h_{q,i}^{eq}(N-1)]$ denotes an N×N circulant channel matrix between the $i^{th}$ transmit layer having $[h_{q,i}^{eq}(0), h_{q,i}^{eq}(1), \ldots, h_{q,i}^{eq}(N-1)]$ as a first column vector and the $q^{th}$ receive antenna.

The received signal r is a time domain signal and may be converted to a frequency domain signal through FFT. The frequency domain signal may be expressed by the following Equation 11:

$$R = D_F r = \Lambda^{eq} S + W$$

$$D_F = I_{N_R} \otimes F$$

$$\Lambda^{eq} = D_F H^{eq} D_F^{-1} \quad (11),$$

where F denotes an N×N FFT matrix and $\otimes$ denotes a Kronecker product.

<MIMO SC-FDE>

The equalizer 409 may include a per-ton minimum mean square error (MMSE) equalizer. The equalizer 409 may minimize $E\{|s_i(n) - \hat{s}_i(n)|^2\}$ using the received signal r and a priori information to obtain a frequency domain estimate $\{\hat{S}_i(k)\}_{k=0}^{N-1}$ of a transmission signal. The a priori information may be expressed by the following Equation 12:

$$\{L_{EA}(c_i(j))\}_{j=0}^{2N-1} = \pi_i(\{L_D(c_i(u))\}_{u=0}^{2N-1}) \quad (12),$$

where $L_D(c_i(u))$ denotes an extrinsic log-likelihood ratio (LLR) of $c_i(u)$ and $c_i(u)$ is a coded bit of the $i^{th}$ transmit layer that is obtained by the MAP detector 413 in a previous iteration.

From $\{L_{EA}(c_i(j))\}_{j=0}^{2N-1}$, a mean vector $\bar{s}_i$ may be expressed by the following Equation 13:

$$\bar{s}_i(n) = \frac{1}{\sqrt{2}}(\tanh(L_{EA}(c_i(2n))/2) + j\tanh(L_{EA}(c_i(2n+1))/2)). \quad (13)$$

In this case, where co-antenna interference (CAI) is cancelled in the received signal, the received signal may be expressed by the following Equation 14:

$$y_i = r - \sum_{p=1, p \neq i}^{N_T} H_p^{eq} \bar{s}_p. \quad (14)$$

Here, $y_i$ may be expressed by the following Equation 15:

$$y_i = [y_{1,i}^T, \ldots, y_{N_R,i}^T]^T \quad (15).$$

Also, $H_p^{eq}$ may be expressed by the following Equation 16:

$$H_p^{eq} = [H_{1,p}^{eq\ T}, \ldots, H_{n_R,p}^{eq\ T}]^T \quad (16).$$

Canceling of the CAI may be performed in a frequency domain.

The time domain estimate $\{s_i(n)\}_{n=0}^{N-1}$ may be expressed by the following Equation 17:

$$\hat{s}_i(n) = g_i^{nH} y_i + c_i(n) \quad (17).$$

$(.)^H$ denotes a complex conjugate transpose. According to an MMSE criterion, an $N_R N \times 1$ weight vector and $c_i(n)$ may be expressed by the following Equation 18:

$$g_i^n = \text{Cov}(y_i, y_i)^{-1} \text{Cov}(y_i, s_i(n)) \quad (18)$$

$$= [H^{eq} V H^{eq\ H} + \sigma_w^2 I_{N_R N}]^{-1} H_i^{eq} v_i(n) e^n$$

$$c_i(n) = \bar{s}_i(n) - g_i^{nH} \bar{y}_i.$$

The $N_R N \times 1$ weight vector may also be expressed by the following Equation 19:

$$g_i^n = [g_{1,i}^{n\,T}, \ldots, g_{N_R,i}^{n\,T}]^T \qquad (19).$$

$V = \text{Diag}(V_1, \ldots, V_{N_T})$ and $V_p = \text{Diag}(v_p(0), \ldots, v_p(N-1))$ is a covariance matrix of $s_p$. $e^n = [0_{1 \times n}\ 1\ 0_{1 \times (N-n-1)}]^T$.

$\hat{s}_i(n)$ may be affected by $L_{EA}(c_i(2n))$; and $L_{EA}(c_i(2n+1))$ via $\bar{s}_i(n)$ and $v_i(n)$. In order that $\hat{s}_i(n)$ may be independent from the affect of $L_{EA}(c_i(2n))$; and $L_{EA}(c_i(2n+1))$, an LLR value may be set to zero. Where the LLR value is set to zero, $\bar{s}_i(n)$ may become zero and $v_i(n)$ may become 1.

Due to the matrix V, a calculation process of a frequency domain weight vector may require a high calculation complexity. In order to reduce the calculation complexity, $V_p$ may be approximated to $$v_p I_N = \frac{1}{N}\ \text{trace}\ (V_p) I_N.$$

$g_i^n$ may be expressed by the following Equation 20:

$$g_i^n \simeq \left( \sum_{p=1}^{N_T} v_p H_p^{eq} H_p^{eqH} + \sigma_\omega^2 I_{N_R N} \right)^{-1} H_i^{eq} e^n. \qquad (20)$$

Since $H_{q,p}^{eq}$ is a circulant matrix, it can be known from the above Equation 20 that $g_i^{nT}$ is an n-point right-shift vector of $g_i^{0^T}$. Accordingly, where the affect of $\bar{s}_i(n)$ corresponding to a priori information is removed, $\hat{s}_i$ may be expressed by the following Equation 21:

$$\hat{s}_i = \sum_{q=1}^{N_R} \left[ (Circ_N[g_{q,i}^0])^H (y_{q,i} - H_{q,i}^{eq} \bar{s}_i) + g_{q,i}^{0H} H_{q,i}^{eq} e^0 \bar{s}_i \right]. \qquad (21)$$

A frequency domain weight vector $G_i^0$ of the per-tone MMSE equalizer may be expressed by the following Equation 22:

$$G_i^0 = D_F g_i^0 = \left( \sum_{p=1}^{N_T} v_p \Lambda_p^{eq} \Lambda_p^{eqH} + \sigma_w^2 I_{N_R N} \right)^{-1} \Lambda_i^{eq} 1_{N \times 1}. \qquad (22)$$

Here, $\Lambda_p^{eq}$ may be expressed by the following Equation 23:

$$\Lambda_p^{eq} = [\Lambda_{1,p}^{eq\,T}, \ldots, \Lambda_{N_R,p}^{eq\,T}]^T \qquad (23).$$

Also, $\Lambda_{q,p}^{eq}$ may be expressed by the following Equation 24:

$$\Lambda_{q,p}^{eq} = F H_{q,p}^{eq} F^H \qquad (24).$$

Here, $\Lambda_{q,p}^{eq}$ denotes a diagonal matrix having $\lambda_{q,p}^{eq}(k)$ as $(k, k)^{th}$ entry. A frequency domain estimate $\hat{s}_i$ may be expressed by the following Equation 25:

$$|\hat{S}_i = \sum_{q=1}^{N_R} \text{Diag}\,[G_{q,i}^0]^H (Y_{q,i} - \Lambda_{q,i}^{eq} \bar{S}_i) + \frac{1}{N}\sum_{q=1}^{N_R}\sum_{k=0}^{N-1}(G_{q,i}^{0*}(k)\Lambda_{q,i}^{eq}(k))I_N \bar{S}_i, \qquad (25)$$

where $(.)^*$ denotes a complex conjugate.

Referring to the above Equation 22 and Equation 25, a per-tone weight vector and a frequency domain estimate corresponding to a $k^{th}$ subchannel may be expressed by the following Equation 26 and Equation 27, respectively:

$$G_i^0(k) = (\Lambda^{eq}(k) Q (\Lambda^{eq}(k))^H + \sigma_w^2 I_{N_R})^{-1} \Lambda_i^{eq}(k) \qquad (26),$$

$$\hat{S}_i(k) = (G_i^0(k))^H Y_i(k) - ((G_i^0(k))^H \Lambda_i^{eq}(k) - \mu_{\hat{s}_i})\bar{S}_i(k) \qquad (27).$$

Here, $\Lambda^{eq}(k)$ denotes an $N_R \times N_T$ MIMO channel corresponding to the $k^{th}$ subchannel, and $\Lambda_i^{eq}(k)$ denotes an $i^{th}$ transmit layer of $\Lambda^{eq}(k)$. $\mu_{\hat{s}_i}$ denotes $$\frac{1}{N}\sum_{k=0}^{N-1}(G_i^0(k))^H \Lambda_i^{eq}(k),$$

and Q denotes $\text{Diag}(v_1, v_2, \ldots, v_{N_T})$. A time domain estimate: $\{\hat{s}_i(n)\}_{n=0}^{N-1}$ may be obtained by performing an IFFT for $\{\hat{S}_i(k)\}_{k=0}^{N-1}$. Where it is assumed that $\hat{s}_i(n)$ has a Gaussian distribution, an extrinsic LLR may be expressed by the following Equation 28:

$$L_E(c_i(2n)) = \frac{2\sqrt{2}\,\text{Re}\{\hat{s}_i(n)\}\mu_{\hat{s}_i}}{\sigma_{\hat{s}_i}^2}, \qquad (28)$$

$$L_E(c_i(2n+1)) = \frac{2\sqrt{2}\,\text{Im}\{\hat{s}_i(n)\}\mu_{\hat{s}_i}}{\sigma_{\hat{s}_i}^2},$$

where $\mu_{\hat{s}_i}$ and $\sigma_{\hat{s}_i}^2$ denotes the mean and variance of $|\hat{s}_i(n)|$, respectively, and $\sigma_{\hat{s}_i}^2 = \mu_{\hat{s}_i} - v_i \mu_{\hat{s}_i}^2$.

The LLR value $\{L_{DA}(c_i(u))\}_{u=0}^{2N-1} = \pi_i^{-1}(\{L_E(c_i(j))\}_{j=0}^{2N-1})$ may be input into the MAP decoder 417. The MAP decoder 417 may calculate extrinsic information associated with a code bit and a decode bit. The extrinsic information $L_D(c_i(u))$ associated with the coded bit may be used as a priori information. Since a signal-to-noise ratio (SNR) of each layer has the same value, the aforementioned MIMO SC-FDE process may be iteratively performed through an unordered successive interference cancellation (SIC) process.

<MIMO OFDM>

OFDM may perform a per-tone equalization in a frequency domain. The per-tone weight vector and the frequency domain estimate corresponding to the $k^{th}$ subchannel may be expressed by the following Equation 29 and Equation 30, respectively:

$$G_i(k) = (\Lambda_i^{eq}(k) V_i(k) (\Lambda_i^{eq}(k))^H + \sigma_w^2 I_{N_R})^{-1} \Lambda_i^{eq}(k) \qquad (29),$$

$$\hat{S}_i(k) = (G_i(k))^H Y_i(k), i=1, 2, \ldots, N_T \qquad (30).$$

Here, $v_i(k)$ is $\text{Diag}(v_0(k), v_1(k), \ldots, v_{N_T}(k))$. Where p=i, $v_p(k)=1$. In other cases, $v_p(k)=1-|\bar{S}_p(k)|^2$.

Extrinsic LLRs $L_E(c_i(2k))$ and $L_E(c_i(2k+1))$ may be expressed by the following Equation 31:

$$L_E(c_i(2k)) = \frac{2\sqrt{2}\,\text{Re}\{\hat{S}_i(k)\}}{1 - \mu_{\hat{S}_i}(k)}, \qquad (31)$$

$$L_E(c_i(2k+1)^p) = \frac{2\sqrt{2}\,\text{Im}\{\hat{S}_i(k)\}}{1 - \mu_{\hat{S}_i}(k)}.$$

Here, $\mu_{\hat{S}_i}(k) = (G_i(k))^H \Lambda_i^{eq}(k)$. The unordered SIC process may be iteratively performed.

Figure 5:
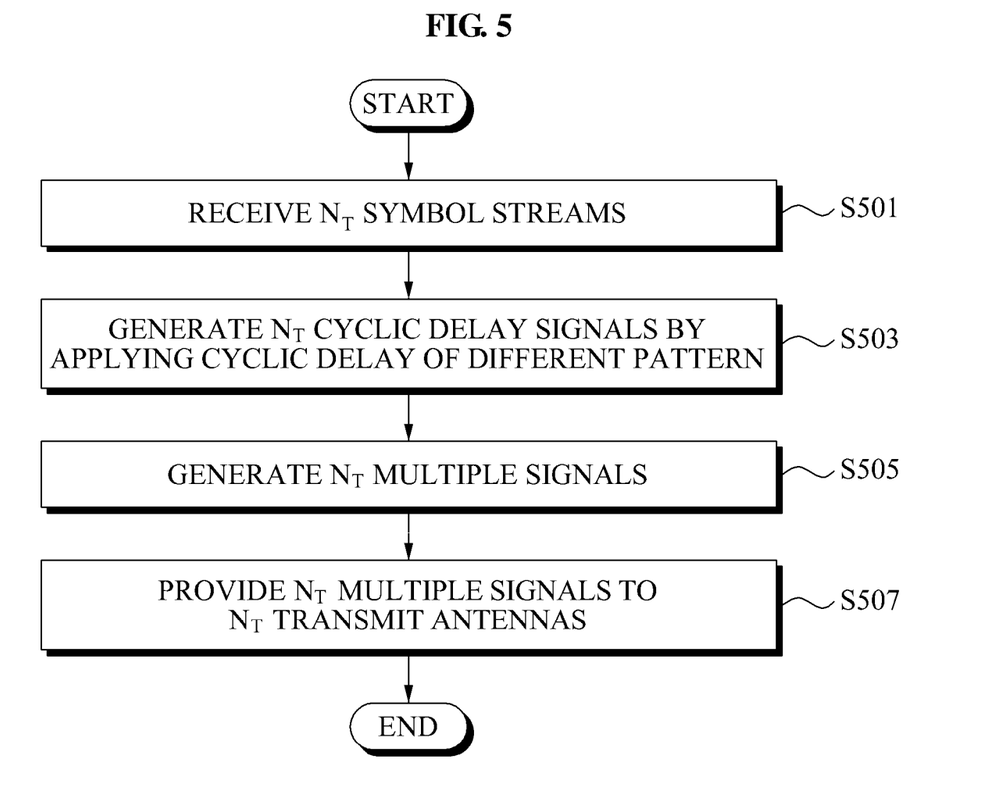
FIG. 5 is a flowchart illustrating an exemplary signal transmission method.

FIG. 5 is a flowchart illustrating an exemplary signal transmission method. The method may be practiced by an apparatus for transmitting a signal described above. For example, the signal transmission method may be performed by the signal transmission apparatus of FIG. 2.

Referring to FIG. 5, the signal transmission method includes receiving $N_T$ symbol streams in parallel in operation S501. Here, $N_T$ is an integer greater than or equal to 2. In operation S503, $N_T$ cyclic delay signals are generated by applying a cyclic delay of a different pattern to each of the $N_T$ symbol streams. In operation S505, $N_T$ multiple signals having a transmit diversity gain are generated by coupling the $N_T$ cyclic delay signals. In operation S507, the generated $N_T$ multiple signals are provided to $N_T$ transmit antennas, respectively, based on a transmit antenna index p of each of the $N_T$ transmit antennas. Here, p=1, 2, . . . , $N_T$.

In some implementations, the operation S505 may include adding up $N_T$ cyclic delay signals to output an addition signal, and adjusting a power level of the addition signal.

<Another Example of Phase Rotation and Cyclic Delay>

Hereinafter, an example of applying the phase rotation and the cyclic delay in order to simultaneously obtain both a diversity gain and a multiplexing gain, regardless of a number of transmit antennas, will be described.

In order to simultaneously obtain both the diversity gain and the multiplexing gain, a signal transmission apparatus may apply a different phase rotation and a cyclic delay to each of $N_T$ symbol streams and may simultaneously transmit, via $N_T$ transmit antennas, the $N_T$ symbol streams where the different phase rotation and the cyclic delay are applied. Since the different phase rotation and the cyclic delay are applied to each of the $N_T$ symbol streams, it is possible to avoid a singularity of a frequency domain channel matrix where a signal reception apparatus separates each of the $N_T$ symbol streams. The phase rotation may be performed by the signal input unit 201 of FIG. 2 and the cyclic delay may be performed by the multiple signal generating unit 203.

Here, $\theta_{p,i}$ and $\Delta_{p,i}$ denote a phase rotation value and a cyclic delay value, respectively, to be applied to an $i^{th}$ symbol stream that is transmitted via a $p^{th}$ transmit antenna. A frequency domain signal corresponding to a $k^{th}$ subchannel that is transmitted via a transmit antenna may be expressed by the following Equation 32:

$$X(k) = \frac{1}{\sqrt{N_T}} \begin{bmatrix} e^{-j\left(2\pi\frac{k\Delta_{1,1}}{N} - \theta_{1,1}\right)} & \cdots & e^{-j\left(2\pi\frac{k\Delta_{1,N_T}}{N} - \theta_{1,N_T}\right)} \\ \vdots & \ddots & \vdots \\ e^{-j\left(2\pi\frac{k\Delta_{N_T,1}}{N} - \theta_{N_T,1}\right)} & \cdots & e^{-j\left(2\pi\frac{k\Delta_{N_T,N_T}}{N} - \theta_{N_T,N_T}\right)} \end{bmatrix} \begin{bmatrix} S_1(k) \\ \vdots \\ S_{N_T}(k) \end{bmatrix}. \quad (32)$$

Accordingly, a frequency domain received signal of the $k^{th}$ subchannel in the signal reception apparatus may be expressed by the following Equation 33:

$$R(k) = \Lambda(k)D(k)S(k) + W(k) = \Lambda_{eq}(k)S(k) + W(k) \quad (33).$$

As described above, in order to obtain a maximum multipath diversity gain, a cyclic delay value $\Delta_i$ may be set to have a value greater than a length of a channel response. According to the above Equation 32, $\Delta_{p,i}$ may be set to $\Delta_{p,i} - \Delta_{p-1,i} > L$ in order to obtain the maximum multi-path diversity gain.

In order to avoid a singularity of an equivalent MIMO channel matrix $\Lambda_{eq}(k)$ corresponding to the $k^{th}$ subchannel, a determinant value of $\Lambda_{eq}(k)$ may have no need to be zero. Determinant det (AB) of an AB matrix that is a multiplication of two matrices A and B may be the same as a multiplication of determinants of each of the matrices A and B. Thus, det (AB)=det(A)det(B). Accordingly, determinant det($\Lambda_{eq}(k)$) of $\Lambda_{eq}(k)$=det($\Lambda(k)$)det(D(k)). In order to avoid the singularity of $\Lambda_{eq}(k)$, there is a need for a pattern of the phase rotation value and a pattern of the cyclic delay value that satisfy a condition that $\Delta_{p,i} - \Delta_{p-1,i} > L$ and also enable |det(D(k))| to have a maximum value.

A sum of absolute square values of elements of a D(k) matrix corresponding to the phase rotation and the cyclic delay may be a square value of Frobenius norm, and may be expressed by the following Equation 34:

$$\|D(k)\|^2 = \sum_{p=1}^{N_T} \sum_{i=1}^{N_T} |[D(k)]_{p,i}|^2 = N_T. \quad (34)$$

Since the square value of Frobenius norm is the same as a sum of square values of singular values of the D(k) matrix. The above Equation 34 may be expressed by the following Equation 35:

$$\|D(k)\|^2 = \text{trace}(D(k)^H D(k)) = \sum_{i=1}^{N_T} \sigma_i^2. \quad (35)$$

Here, $\sigma_i$ denotes the singular values of the D(k) matrix. Since an arithmetic mean has a value greater than or equal to a geometric mean at all times, the square values of the singular values of the D(k) matrix may have a relationship as given by the following Equation 36:

$$\left(\prod_{i=1}^{N_T} \sigma_i^2\right)^{1/N_T} \leq \frac{\sum_{i=1}^{N_T} \sigma_i^2}{N_T} = 1. \quad (36)$$

Also, since an absolute value |det(D(k))| of the D(k) matrix determinant is the same as a multiplication of singular values of the D(k) matrix, a maximum value of the absolute value |det(D(k))| may be expressed, using the above Equation 36, by the following Equation 37.

$$|\det(D(k))| = \sum_{i=1}^{N_T} \sigma_i \leq 1. \quad (37)$$

Specifically, it is proved that |det(D(k))| may have a value of maximum '1'. Accordingly, the signal transmission apparatus may use the pattern of the phase rotation value and the pattern of the cyclic delay value that satisfy the condition that $\Delta_{p,i} - \Delta_{p-1,i} > L$ and the condition that |det(D(k))| has a value of '1'. Where the pattern of the phase rotation value and the pattern of the cyclic delay value that satisfy the above conditions are used, it may be possible to enhance a reliability for an initial estimate in an Eb/N0 versus block error rate performance.

For example, where a number of transmit antennas is two, the pattern of the phase rotation value and the pattern of the cyclic delay value that satisfy the above conditions may be obtained as follows. A determinant of the D(k) matrix may be expressed by the following Equation 38:

$$\det(D(k)) = \frac{1}{2}\det\left(\begin{bmatrix} e^{-j\left(2\pi\frac{k\Delta_{1,1}}{N}-\theta_{1,1}\right)} & e^{-j\left(2\pi\frac{k\Delta_{1,2}}{N}-\theta_{1,2}\right)} \\ e^{-j\left(2\pi\frac{k\Delta_{2,1}}{N}-\theta_{2,1}\right)} & e^{-j\left(2\pi\frac{k\Delta_{2,2}}{N}-\theta_{2,2}\right)} \end{bmatrix}\right) \quad (38)$$

$$= \frac{1}{2}\left(\begin{array}{c} e^{-j\left(2\pi\frac{k(\Delta_{1,1}+\Delta_{2,2})}{N}-(\theta_{1,1}+\theta_{2,2})\right)} - \\ e^{-j\left(2\pi\frac{k(\Delta_{1,2}+\Delta_{2,1})}{N}-(\theta_{1,2}+\theta_{2,1})\right)} \end{array}\right).$$

Accordingly, it is possible to use any of the pattern of the phase rotation value and the pattern of the cyclic devalue value that satisfy a condition that $\Delta_{2,1}-\Delta_{1,1}=(\Delta_{2,2}-\Delta_{1,2})>L$ and a condition that $(\theta_{1,1}+\theta_{2,2})-(\theta_{1,2}+\theta_{2,1})=\pi$. Where the number of transmit antennas is greater than two, it is possible to obtain the pattern of the phase rotation value and the pattern of the cyclic delay value using a similar scheme.

Figure 6:
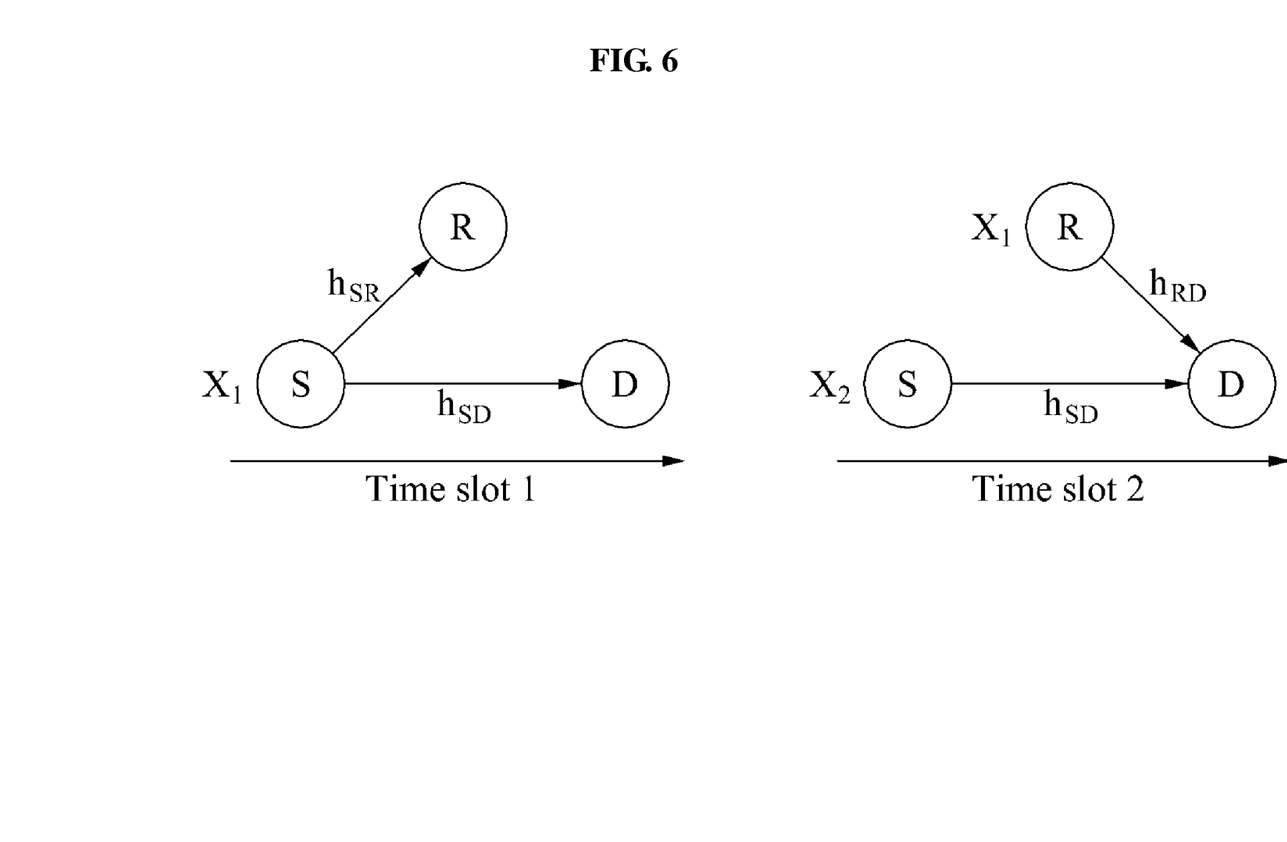
FIG. 6 is a diagram illustrating an exemplary protocol to use a single relay in a cooperative relaying circumstance.
Figure 7:
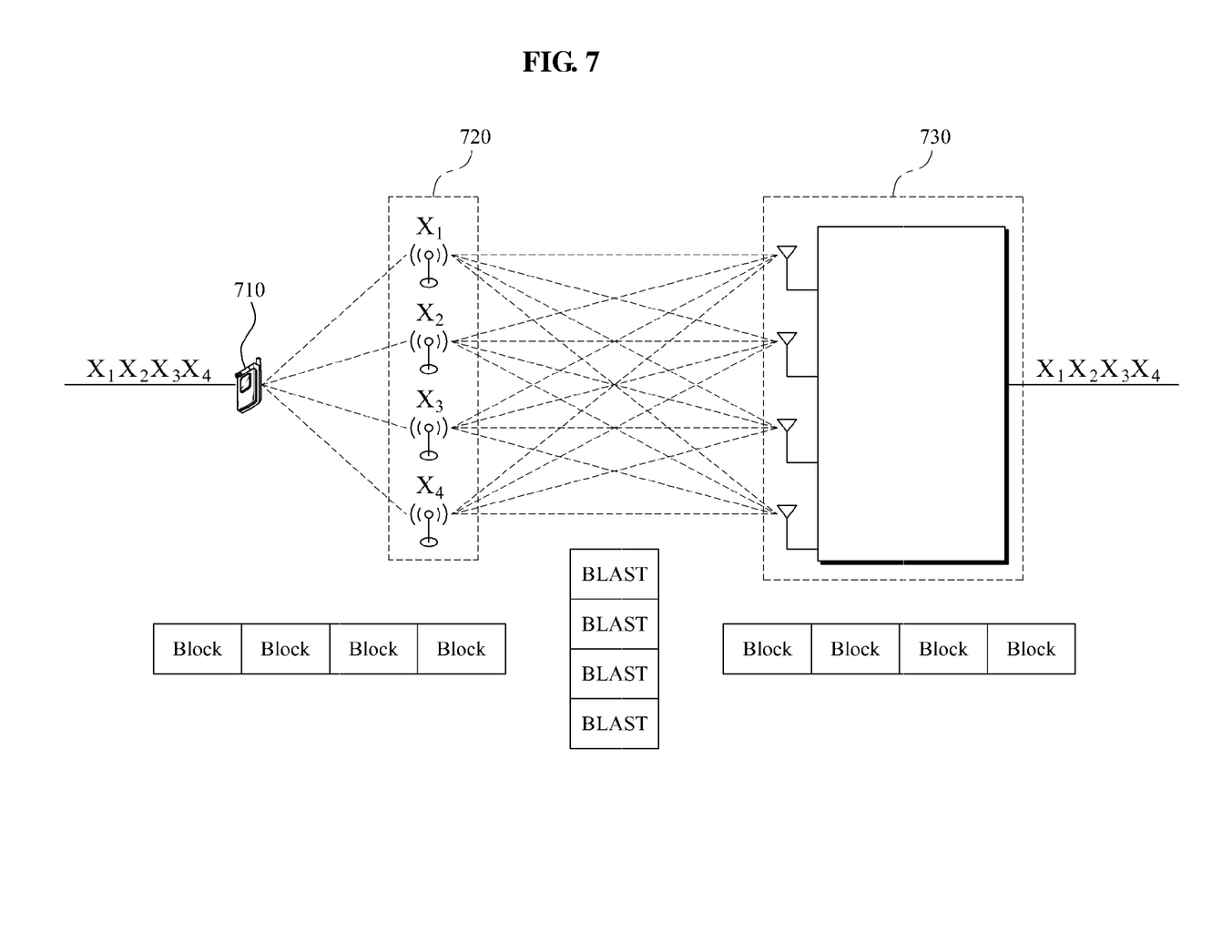
FIG. 7 is a diagram illustrating an exemplary cooperative relaying circumstance that may be applicable to a signal transmission method.

FIG. 6 illustrates an exemplary protocol to use a single relay in a cooperative relaying circumstance. FIG. 7 illustrates an exemplary protocol in a cooperative relaying circumstance that may apply a signal transmission method.

In the protocol example of FIG. 6, a transmission/reception signal model may be expressed by the following Equation 39, and may also be interpreted as a MIMO system having two transmit/receive antennas:

$$\begin{bmatrix} R_1(k) \\ R_2(k) \end{bmatrix} = \begin{bmatrix} \lambda_{SD}(k) & 0 \\ \lambda_{SR}(k)\lambda_{RD}(k) & \lambda_{SD}(k) \end{bmatrix}\begin{bmatrix} S_1(k) \\ S_2(k) \end{bmatrix} + \begin{bmatrix} W_1(k) \\ W_2(k) \end{bmatrix}. \quad (39)$$

Referring to the above Equation 39, a second layer may not obtain a spatial diversity gain. In the protocol example of FIG. 6, a signal transmission/reception method according to example embodiments may be expressed by the following Equation 40:

$$\begin{bmatrix} R_1(k) \\ R_2(k) \end{bmatrix} = \frac{1}{\sqrt{2}}\begin{bmatrix} \lambda_{SD}(k) & 0 \\ \lambda_{SR}(k)\lambda_{RD}(k) & \lambda_{SD}(k) \end{bmatrix}\begin{bmatrix} -1 & 1 \\ e^{-j2\pi\frac{kL_{max}}{N}} & e^{-j2\pi\frac{kL_{max}}{N}} \end{bmatrix}$$
$$\begin{bmatrix} S_1(k) \\ S_2(k) \end{bmatrix} + \begin{bmatrix} W_1(k) \\ W_2(k) \end{bmatrix}. \quad (40)$$

Accordingly, in the protocol example of FIG. 6, where a signal transmission/reception method consistent with the disclosure herein is applied, all of two layers may obtain a spatial diversity gain.

As shown in FIG. 7, even where a single user 710, a multi relay 720, and a multi-antenna destination 730 exist, the signal transmission/reception method consistent with the disclosure herein may be applicable.

According to example(s) described above, a method and apparatus for transmitting and/or receiving a signal may be provided that simultaneously obtains both a multiplexing gain and a transmit diversity gain. Both the diversity gain and the multiplexing gain may be obtained regardless of a number of transmit antennas. Here, since a reception end does not require an ordering process for an SIC process, a calculation complexity for each iteration may be reduced in comparison to a conventional H-Blast scheme.

Also, according to example(s) described above, it is possible to simultaneously provide both a multiplexing gain and a transmit diversity gain by applying a different cyclic delay diversity pattern to each independent symbol stream and by transmitting symbol streams with the applied different cyclic delay diversity pattern via all the transmit antennas.

Also, according to example(s) described above, since an equivalent SNR value of a reception end of a layer corresponding to each of a plurality of symbol streams is the same, an ordering process may not be required for an SIC process.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus configured to transmit a signal in a multiple input multiple output (MIMO) system, the apparatus comprising:
    an input receiver configured to receive $N_T$ symbol streams in parallel, where $N_T$ is an integer greater than or equal to 2;
    a multiple signal generator configured to generate $N_T$ multiple signals having a transmit diversity gain by applying a cyclic delay of a different pattern to each of the $N_T$ symbol streams; and
    a multiple signal provider configured to provide the generated $N_T$ multiple signals to $N_T$ transmit antennas, respectively, based on a transmit antenna index of each of the $N_T$ transmit antennas,
    wherein the cyclic delay of the different pattern is determined based on a cyclic delay value, a transmit antenna index, and a symbol stream index, and the cyclic delay value is set to be greater than a length of a channel response.

2. The apparatus of claim 1, wherein the input receiver is configured to convert a phase of each of the $N_T$ symbol streams to provide the $N_T$ symbol streams with the converted phase to the multiple signal generator.

3. An apparatus configured to transmit a signal in a multiple input multiple output (MIMO) system, the apparatus comprising:
    an input receiver configured to receive $N_T$ symbol streams in parallel, where $N_T$ is an integer greater than or equal to 2;

a multiple signal generator configured to generate $N_T$ multiple signals having a transmit diversity gain by applying a cyclic delay of a different pattern to each of the $N_T$ symbol streams; and a multiple signal provider configured to provide the generated $N_T$ multiple signals to $N_T$ transmit antennas, respectively, based on a transmit antenna index of each of the $N_T$ transmit antennas, wherein:

the input receiver is configured to convert a phase of each of the $N_T$ symbol streams to satisfy a condition that $\Delta_{p,i} - \Delta_{p-1,i} > L$ and a condition that $|\det(D(k))|$ has a value of '1', and the multiple signal generator is configured to apply the cyclic delay of the different pattern to each of the $N_T$ symbol streams, provided from the input receiver, to satisfy the condition that $\Delta_{p,i} - \Delta_{p-1,i} > L$ and the condition that $|\det(D(k))|$ has the value of '1', where $\Delta_{p,i}$ denotes a cyclic delay value to be applied to an $i^{th}$ symbol stream that is transmitted via a $p^{th}$ transmit antenna, L denotes a length of a channel response, $|\det(D(k))|$ denotes an absolute value of a $D(k)$ matrix determinant corresponding to a phase rotation and the cyclic delay.

4. The apparatus of claim 1, wherein the multiple signal generator comprises:

a cyclic delay pattern applier configured to apply the cyclic delay of the different pattern to each of the $N_T$ symbol streams;

an adder configured to add up $N_T$ outputs of the cyclic delay pattern applier; and a power level adjuster configured to adjust a power level of a signal that is output from the adder.

5. The apparatus of claim 4, wherein the power level adjuster is configured to adjust the power level of the signal to be $1/\sqrt{N_T}$.

6. An apparatus configured to transmit a signal in a multiple input multiple output (MIMO) system, the apparatus comprising:

an input receiver configured to receive $N_T$ symbol streams in parallel, where $N_T$ is an integer greater than or equal to 2;

a multiple signal generator configured to generate $N_T$ multiple signals having a transmit diversity gain by applying a cyclic delay of a different pattern to each of the $N_T$ symbol streams; and a multiple signal provider configured to provide the generated $N_T$ multiple signals to $N_T$ transmit antennas, respectively, based on a transmit antenna index of each of the $N_T$ transmit antennas, wherein the cyclic delay of the different pattern is expressed by $\Delta_i(p-N_T)_{N_T}$, where $\Delta_i$ denotes a cyclic delay value, i denotes a symbol stream index, and p denotes a transmit antenna index where p=1, 2, ..., $N_T$.

7. The apparatus of claim 6, wherein the cyclic delay value $\Delta_i$ is set to be greater than a length of a channel response.

8. An apparatus for transmitting and receiving a multiple signal in a MIMO system, the apparatus comprising $N_R$ receive antennas, each configured to receive the multiple signal having a transmit diversity gain, where $N_R$ is an integer greater than or equal to 2; and a cyclic prefix (CP) remover configured to remove a CP in each of the received multiple signal having the transmit diversity gain, wherein each of the received multiple signals having the transmit diversity gain are signals generated by applying a cyclic delay of a different pattern to each of $N_T$ symbol streams, and transmitted via $N_T$ transmit antennas, respectively, where $N_T$ is an integer greater than or equal to 2, wherein the cyclic delay of the different pattern is expressed by $\Delta_i(p-N_T)_{N_T}$, where $\Delta_i$ denotes a cyclic delay value, i denotes a symbol stream index, and p denotes a transmit antenna index where p=1, 2, ..., $N_T$.

9. The apparatus of claim 8, wherein each of the $N_T$ symbol streams with a converted phase and are defined by the following equation:

$$\tilde{s}_{i,p} = \exp\left(j2\pi \frac{(i(p-i))_{N_T}}{N_T}\right) s_i,$$

where $\tilde{s}_{i,p}$ denotes each of the $N_T$ symbol streams with the converted phase, $s_i$ denotes each of the $N_T$ symbol streams, and i denotes a symbol stream index, and p denotes a transmit antennas index where p=1, 2, ..., $N_T$.

10. The apparatus of claim 8, wherein a channel impulse response between the $N_T$ transmit antennas and the $N_R$ receive antennas is defined by the following equation:

$$h_{q,i}^{eq}(k) = \frac{1}{\sqrt{N_T}} \sum_{p=1}^{N_T} \tilde{h}_{q,p}^i \left(k - \Delta_i(p-i)_{N_T}\right)_N$$

$$\tilde{h}_{q,p}^i = \exp\left(j2\pi \frac{(i(p-i))_{N_T}}{N_T}\right) h_{q,p},$$

where i denotes a symbol stream index, q denotes a receive antenna index, p denotes a transmit antenna index, $\Delta_i$ denotes a cyclic delay value, k denotes a sample index of a symbol stream, and N denotes a block size of the symbol stream.

11. A method of transmitting a signal in a MIMO system, the method comprising:

receiving $N_T$ symbol streams in parallel, where $N_T$ is an integer greater than or equal to 2;

generating $N_T$ cyclic delay signals by applying a cyclic delay of a different pattern to each of the $N_T$ symbol streams;

generating $N_T$ multiple signals having a transmit diversity gain by coupling the $N_T$ cyclic delay signals; and providing the generated $N_T$ multiple signals to $N_T$ transmit antennas, respectively, based on a transmit antenna index of each of the $N_T$ transmit antennas, wherein the cyclic delay of the different pattern is determined based on a cyclic delay value, a transmit antenna index, and a symbol stream index, and the cyclic delay value is set to be greater than a length of a channel response.

12. The method of claim 11, wherein the generating of the $N_T$ cyclic delay signals comprises converting a phase of each of the $N_T$ symbol streams and applying the cyclic delay of the different pattern to each of the $N_T$ symbol streams with the converted phase.

13. A method of transmitting a signal in a MIMO system, the method comprising:

receiving $N_T$ symbol streams in parallel, where $N_T$ is an integer greater than or equal to 2;

generating $N_T$ cyclic delay signals by applying a cyclic delay of a different pattern to each of the $N_T$ symbol streams;

generating $N_T$ multiple signals having a transmit diversity gain by coupling the $N_T$ cyclic delay signals; and providing the generated $N_T$ multiple signals to $N_T$ transmit antennas, respectively, based on a transmit antenna index of each of the $N_T$ transmit antennas, wherein:

the generating of the $N_T$ cyclic delay signals comprises converting a phase of each of the $N_T$ symbol streams and applying the cyclic delay of the different pattern to each of the phase-converted $N_T$ symbol streams to satisfy a condition that $\Delta_{p,i} - \Delta_{p-1,i} > L$ and a condition that $|\det(D(k))|$ has a value of '1', where $\Delta_{p,i}$ denotes a cyclic delay value to be applied to an $i^{th}$ symbol stream that is transmitted via a $p^{th}$ transmit antenna, L denotes a length of a channel response, and $|\det(D(k))|$ denotes an absolute value of a $D(k)$ matrix determinant corresponding to a phase rotation and the cyclic delay.

14. The method of claim 11, wherein the generating of the $N_T$ multiple signals comprises:

adding up the $N_T$ cyclic delay signals to output an addition signal; and adjusting a power level of the addition signal.

15. A method of transmitting a signal in a MIMO system, the method comprising:

receiving $N_T$ symbol streams in parallel, where $N_T$ is an integer greater than or equal to 2;

generating $N_T$ cyclic delay signals by applying a cyclic delay of a different pattern to each of the $N_T$ symbol streams;

generating $N_T$ multiple signals having a transmit diversity gain by coupling the $N_T$ cyclic delay signals; and providing the generated $N_T$ multiple signals to $N_T$ transmit antennas, respectively, based on a transmit antenna index of each of the $N_T$ transmit antennas, wherein the cyclic delay of the different pattern is expressed by $\Delta_i(p-N_T)_{N_T}$, where $\Delta_i$ denotes a cyclic delay value, i denotes a symbol stream index, and p denotes a transmit antenna index where $p=1, 2, \ldots, N_T$.

16. The method of claim 14, wherein the power level of the addition signal is adjusted to be $1/\sqrt{N_T}$.

17. The method of claim 15, wherein the cyclic delay value $\Delta_i$ is set to be greater than a length of a channel response.

* * * * *